US008988360B2

(12) United States Patent
Takahashi et al.

(10) Patent No.: US 8,988,360 B2
(45) Date of Patent: Mar. 24, 2015

(54) METHOD AND APPARATUS FOR DETECTING A TOUCH POSITION, AND TOUCHSCREEN DISPLAY APPARATUS HAVING THE SAME

(75) Inventors: Seiki Takahashi, Cheonan-si (KR); Satoru Saito, Tokyo (JP); Sang-Soo Kim, Seoul (KR); Bong-Hyun You, Yongin-si (KR); Byoung-Jun Lee, Cheonan-si (KR); Jai-Hyun Koh, Anyang-si (KR)

(73) Assignee: Samsung Display Co., Ltd. (KR)

( * ) Notice: Subject to any disclaimer, the term of this patent is extended or adjusted under 35 U.S.C. 154(b) by 1175 days.

(21) Appl. No.: 12/476,805

(22) Filed: Jun. 2, 2009

(65) Prior Publication Data

US 2010/0156819 A1      Jun. 24, 2010

(30) Foreign Application Priority Data

Dec. 24, 2008   (KR) .......................... 10-2008-133084

(51) Int. Cl.
*G06F 3/044*   (2006.01)
*G06F 3/041*   (2006.01)

(52) U.S. Cl.
CPC .............. *G06F 3/044* (2013.01); *G06F 3/0412* (2013.01)
USPC ........... 345/173; 345/104; 345/174; 345/175; 345/176

(58) Field of Classification Search
USPC ........................................ 345/173–176, 104
See application file for complete search history.

(56) References Cited

U.S. PATENT DOCUMENTS

| | | | | |
|---|---|---|---|---|
| 5,194,862 A | * | 3/1993 | Edwards | 341/20 |
| 7,126,350 B2 | * | 10/2006 | Miyasaka | 324/662 |
| 2006/0279548 A1 | * | 12/2006 | Geaghan | 345/173 |
| 2007/0176905 A1 | * | 8/2007 | Shih et al. | 345/173 |
| 2009/0127436 A1 | * | 5/2009 | Johnson | 250/208.1 |
| 2011/0080365 A1 | * | 4/2011 | Westerman | 345/173 |

FOREIGN PATENT DOCUMENTS

| | | |
|---|---|---|
| JP | 08044493 A | 2/1996 |
| JP | 11271712 A | 10/1999 |
| JP | 2001-282440 A | 10/2001 |
| JP | 2003233429 A | 8/2003 |
| JP | 2005134371 A | 5/2005 |
| JP | 2006004216 A | 1/2006 |
| JP | 2007048275 A | 2/2007 |
| JP | 2007139468 A | 6/2007 |
| JP | 2007226811 A | 9/2007 |
| JP | 2007286814 A | 11/2007 |
| JP | 2009540452 A | 11/2009 |
| KR | 1020080018556 A | 2/2008 |
| KR | 1020080075611 A | 8/2008 |
| WO | 2007144881 A1 | 12/2007 |

* cited by examiner

*Primary Examiner* — William Boddie
*Assistant Examiner* — Leonid Shapiro
(74) *Attorney, Agent, or Firm* — Cantor Colburn LLP

(57) ABSTRACT

A method for detecting a touch position includes integrating a readout current detected at a sensing part to generate an integrated readout voltage, converting the integrated readout voltage into a digital converted readout voltage data and compensating a variation of the digital converted readout voltage data to determine whether the sensing part is touched.

14 Claims, 14 Drawing Sheets

SMALL POSITIVE CHANGE

NO TOUCH

METHOD AND APPARATUS FOR DETECTING A TOUCH POSITION, AND TOUCHSCREEN DISPLAY APPARATUS HAVING THE SAME

This application claims priority to Korean Patent Application No. 2008-133084, filed on Dec. 24, 2008, and all the benefits accruing therefrom under 35 U.S.C. §119, the contents of which in its entirety are herein incorporated by reference.

BACKGROUND OF THE INVENTION

1. Field of the Invention

The present invention relates to a method and apparatus for detecting a touch position, and a touchscreen display apparatus having the apparatus. More particularly, the present invention relates to a method and apparatus for detecting a touch position having a substantially enhanced touch position detecting capability, and a touchscreen display apparatus having the apparatus.

2. Description of the Related Art

Generally, a touch panel is included on an upper portion of a liquid crystal display ("LCD") device to enable a user to select information displayed on a screen of the LCD device by making contact with a finger or an object, such as a stylus, for example. The touch panel detects a touch position at which the finger or the object makes contact with the screen, and transforms sensed contact information corresponding to the touch position into an input signal to be utilized by the LCD device. The touch panel typically includes a first substrate, a second substrate spaced apart from the first substrate by a predetermined distance, a first transparent electrode disposed on the first substrate, and a second transparent electrode disposed on the second substrate. The first electrode and the second electrode face each other, and a liquid crystal layer is interposed between the first substrate and the second substrate.

When a computer includes the LCD device having the touch panel, an additional input apparatus such as a keyboard or a mouse, for example, is not necessary. Thus, the touch panel is widely used.

When the touch panel is disposed on an LCD panel of the LCD device, however, a thickness and size of the LCD device having the touch panel is increased. Thus, to decrease the thickness and size of the LCD device having the touch panel, the touch panel may be integrally formed with the LCD device.

The LCD device may include a photo sensor which detects a shadow formed by the finger or the object blocking light when touching the touch panel or the photo sensor may detect additional light generated from a light pen touching the touch panel. A readout voltage detected from the touch panel is compared with a reference voltage by a comparator to determine a touch state of the LCD device. More specifically, the touch state is determined by the discriminator when the readout voltage is greater than the reference voltage, and a non-touch state is determined by the discriminator when the readout voltage is less than or equal to the reference voltage, for example.

However, the reference voltage is a fixed voltage, and a mis-touch discrimination operation occurs as a result. More particularly, when a reference voltage having a relatively high level is used in a touch discrimination operation, normal touch discrimination may be performed. However, when reference voltage having relatively low level is used in the touch discrimination operation, many or all points on the touch panel may be determined to be a touch state, thereby degrading an accuracy of the touch discrimination operation.

Additionally, a variation of the readout voltage is caused by various factors such as a threshold voltage of a transistor and a sensor gap variation. Moreover, a threshold voltage shift of the transistor due to a current flowing in the transistor, as well as a temperature dependence of a liquid crystal capacitor, further cause a drift of the readout voltage. Therefore, the accuracy of the touch discrimination operation is further degraded, and a touch state is thereby mis-determined.

BRIEF SUMMARY OF THE INVENTION

Exemplary embodiments provide a method of detecting a touch position having a substantially enhanced touch position detecting capability by effectively preventing a mis-determination of a touch state.

Exemplary embodiments also provide a touch position detecting apparatus for performing the method.

Exemplary embodiments also provide a touchscreen display apparatus having the apparatus.

According to an exemplary embodiment, a method of detecting a touch position includes integrating a readout current detected at a sensing part to generate an integrated readout voltage. The integrated readout voltage is converted into a digital converted readout voltage data. A variation of the digital converted readout voltage data is compensated to determine whether the sensing part is touched.

In an exemplary embodiment, the compensating the variation of the digital converted readout voltage data may include comparing a difference between a current data corresponding to the digital converted readout voltage data and a reference data with a threshold data, discriminating a touch operation of the sensing part to output a touch discrimination data when the difference between the current data and the reference data is substantially greater than a positive touch threshold data, and rewriting the current data as the reference data.

In an exemplary embodiment, the method further includes rewriting the current data as the reference data when the difference between the current data and the reference data is substantially less than a negative reset threshold data.

In an exemplary embodiment, the method further includes adjusting a reset voltage provided to a reset transistor of the sensing part to generate an adjusted reset voltage.

In an exemplary embodiment, the adjusting the reset voltage includes: calculating a current reset adjustment voltage based on an average value of a reference data; dividing a voltage in response to the current reset adjustment voltage to generate a divided voltage; and providing the reset transistor with the reset voltage in response to the divided voltage.

In an exemplary embodiment, the calculating the current reset adjustment voltage is performed based on $VR(n)=VR(n-1)+(A(r)-D(T))\times a$, where $VR(n)$ is the current reset adjustment voltage, $VR(n-1)$ is a previous reset adjustment voltage, $A(r)$ is an average value of a whole reference data, $D(T)$ is target reference data and "a" is a compensation coefficient.

According to an alternative exemplary embodiment, an apparatus for detecting a touch position includes an integrator, an analog-to-digital converter and a digital processing circuit. The integrator integrates a readout current detected at a sensing part to generate an integrated readout voltage. The analog-to-digital converter converts the integrated readout voltage into a digital converted readout voltage data. The digital processing circuit compensates a variation of the digital converted readout voltage data to determine whether the sensing part is touched.

In an exemplary embodiment, the digital processing circuit may include a reference data memory, a control signal generating part and a digital comparator. The reference data memory stores a reference data. The control signal generating part provides the integrator with a reset signal. The control signal generating part also provides the analog-to-digital converter with a latch pulse. The digital comparator compares a difference between a current data provided from the analog-to-digital converter and a reference data provided from the reference data memory with a threshold data in response to a control signal provided from the control signal generating part to discriminate whether a touch operation is performed.

In an exemplary embodiment, a bit-depth of digital converted readout voltage data outputted from the analog-to-digital converter and the reference data is in a range from four bits to six bits.

In an exemplary embodiment, the digital comparator rewrites the current data as the reference data in the reference data memory when the difference between the current data and the reference data is less than a negative reset threshold data.

In an exemplary embodiment, the digital comparator outputs a touch discrimination data and rewrites the current data as the reference data in the reference data memory when the difference between the current data and the reference data is greater than a positive reset threshold data.

In an exemplary embodiment, the apparatus further includes a touch data memory which stores the touch discrimination data provided from the digital comparator and maintains one of a touch state and a non-touch state during a predetermined frame based on the touch discrimination data provided from the digital comparator.

In an exemplary embodiment, the reference data is rewritten based on a start operation of the apparatus.

In an exemplary embodiment, the digital processing circuit determines the touch state is performed when the difference between the current data and the reference data is greater than a positive threshold data.

In an exemplary embodiment, the sensing part includes: a reference capacitor connected to a previous gate line through a first terminal thereof; a sensing capacitor having a capacitance which varies based on a touch operation; a writing transistor having a gate connected to a first terminal of the sensing capacitor and a second terminal of the reference capacitor, a source connected to a bias voltage line which transmits a bias voltage and a drain connected to a sensing voltage line which transmits a sensing voltage; and a reset transistor including a gate connected to a current gate line, a source connected to a reset voltage line which transmits a reset voltage and a drain connected to a first terminal of the sensing capacitor, a second terminal of the reference capacitor and a gate of the writing transistor.

In an exemplary embodiment, the apparatus further includes a reset voltage adjusting part which adjusts a reset voltage provided to the reset transistor.

In an exemplary embodiment, the reset voltage adjusting part includes: a calculating part which calculates a current reset adjustment voltage based on an average value of a whole reference data stored in the reference data memory; a voltage dividing part which divides a voltage in response to the current reset adjustment voltage provided from the calculating part; and a buffer amplifier which provides the reset transistor with an adjusted reset voltage adjusted in response to a divided voltage provided from the voltage dividing part.

In an exemplary embodiment, the calculating part provides the voltage dividing part with the current reset adjustment voltage based on $VR(n)=VR(n-1)+(A(r)-D(T))\times a$, wherein $VR(n)$ is the current reset adjustment voltage, $VR(n-1)$ is a previous reset adjustment voltage, $A(r)$ is an average value of a whole reference data, $D(T)$ is target reference data and "a" is a compensation coefficient.

In an exemplary embodiment, the sensing part comprises groups of sensing pixels corresponding to digital comparators of a plurality of the digital comparators, and the digital processing circuit further includes a spatial filter which receives one of a touch signal and a non-touch signal provided from each of the digital comparators to discriminate whether a corresponding group of sensing pixels is in one of a touch state and a non-touch state, respectively.

According to another alternative exemplary embodiment, a touchscreen display apparatus includes a liquid crystal display panel and a touch position detection apparatus. The liquid crystal display panel includes a touchscreen display substrate including a pixel array and a sensing array, an opposite substrate disposed opposite to the touchscreen display substrate, and a liquid crystal layer interposed between the touchscreen display substrate and the opposite substrate. The touch position detection apparatus includes an integrator which integrates a readout current detected at a sensing part to generate an integrated readout voltage, an analog-digital converter which converts the integrated readout current into a digital converted readout voltage data, and a digital processing circuit which compensates a variation of the digital converted readout voltage data to determine whether the sensing part is touched.

According to exemplary embodiments, in a method and apparatus for detecting a touch position and a touchscreen display apparatus having the apparatus, a variation of a readout voltage generated by a threshold voltage of transistors disposed in a touch panel and/or a sensor gap variation is compensated for, and mis-touch discrimination is thereby effectively prevented. Therefore, a touch position detecting capability of the touch screen display panel is substantially enhanced.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
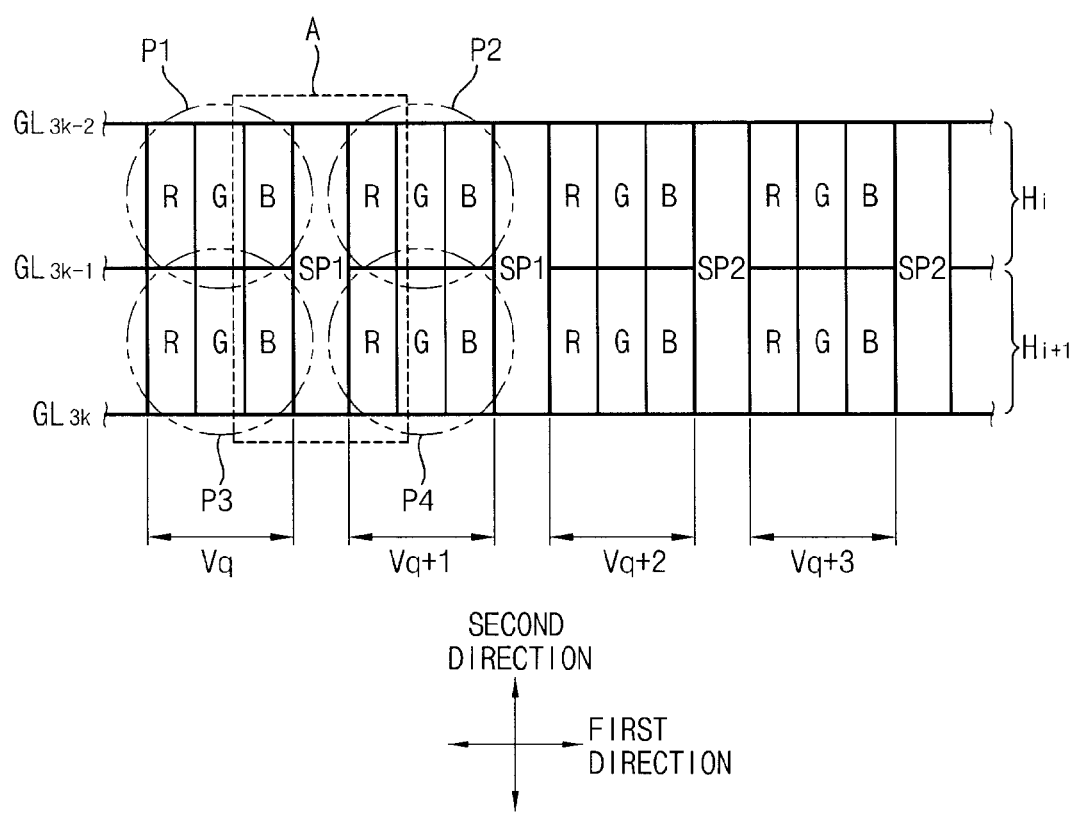
FIG. 1 is a plan view illustrating an exemplary embodiment of a touchscreen display device according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments will be described in further detail with reference to the accompanying drawings.

Figure 2:
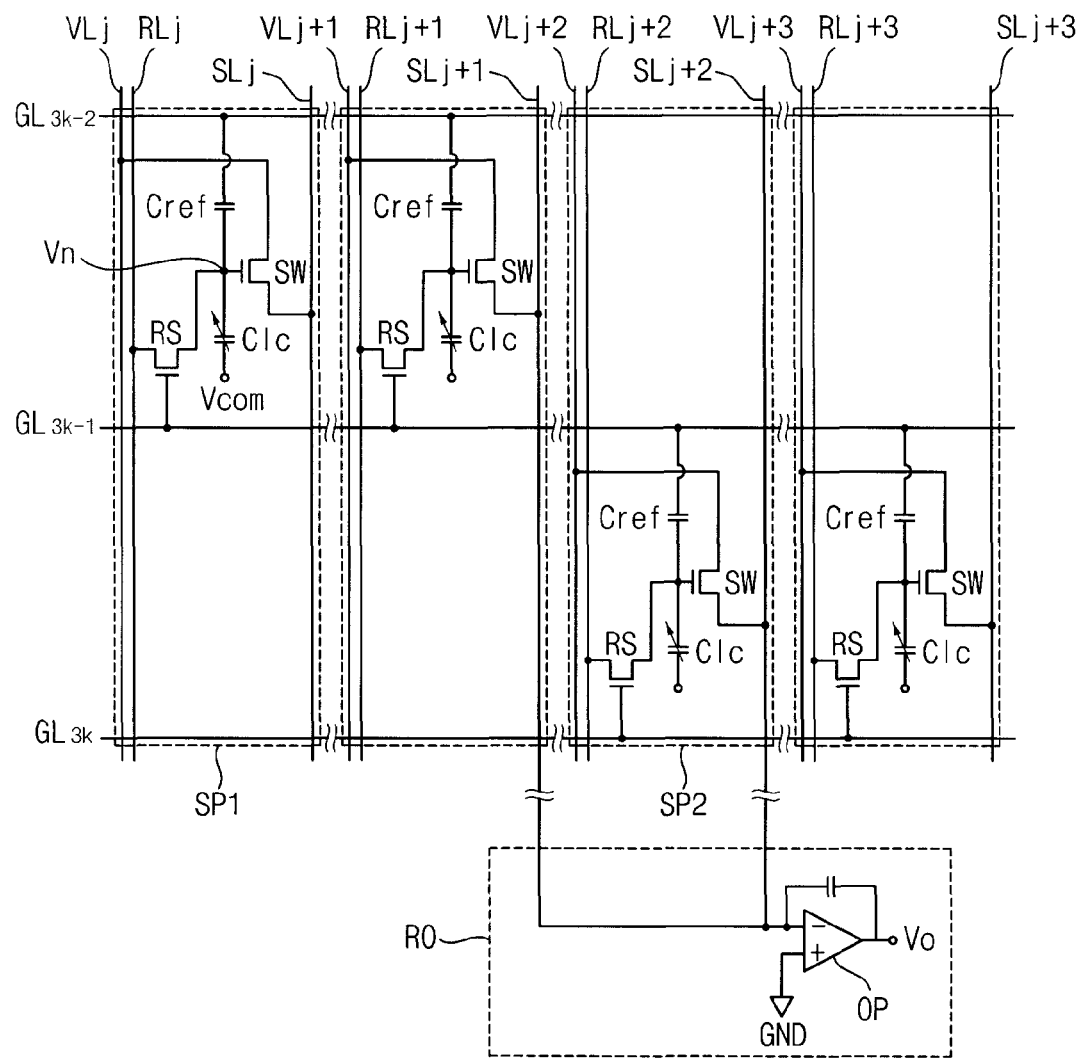
FIG. 2 is an equivalent schematic circuit diagram of an exemplary embodiment of a sensing part of the touchscreen display device of FIG. 1.

FIG. 1 is a plan view of an exemplary embodiment of a touchscreen display device. FIG. 2 is an equivalent schematic circuit diagram of an exemplary embodiment of a sensing part of the touchscreen display device in FIG. 1.

Referring to FIGS. 1 and 2, a touchscreen display device according to an exemplary embodiment includes pixel parts P which display an image thereon, sensing parts SP which sense a touch status thereof, and a readout part RO.

In an exemplary embodiment, the pixel parts P may be disposed in a substantially matrix pattern. Each of the pixel parts P may include color pixels. In an exemplary embodiment, for example, the pixel parts P may include a red pixel R, a green pixel G and a blue pixel B disposed adjacent to each other along a first direction. In an exemplary embodiment, the first direction may be a substantially horizontal direction, as viewed in FIG. 1.

The pixel parts P may include pixel rows Hi and Hi+1 and pixel columns Vq, . . . , Vq+3, but alternative exemplary embodiments are not limited thereto. In an exemplary embodiment, the pixel columns Vq, . . . , Vq+3 extend along the first direction, while the pixel rows Hi and Hi+1 extend along a second direction substantially perpendicular to the first direction. Hereinafter, the pixel rows Hi and Hi+1 are referred to as horizontal rows, and the pixel columns Vq, . . . , Vq+3 are referred to as vertical columns.

In an exemplary embodiment, for example, an i-th horizontal row Hi may include pixel parts P connected to a (3 k−1)-th gate line GL3k−1, and an (i+1)-th horizontal row may include pixel parts P connected to a (3 k)-th gate line GL3k. In an exemplary embodiment, "i" and "q" are natural numbers.

The sensing parts SP may be disposed in an area corresponding to a plurality of the pixel parts P sequentially disposed between adjacent horizontal rows along the second direction. As described above, the second direction may be a substantially vertical direction, e.g., substantially perpendicular to the first direction. The sensing parts SP may include two types of sensing parts, e.g., a first sensing part SP1 and a second sensing part SP2. As shown in FIG. 1, the first sensing part SP1 is disposed in an area corresponding to a first pixel part P1 of the pixel parts P and third pixel parts P3 of the pixel parts P, and disposed between the first pixel part P1 and a second pixel part P2 of the pixel parts P.

As shown in FIG. 1, a pair of the first sensing parts SP1 and a pair of the second sensing parts SP2 are disposed one after another, e.g., alternately, in the first direction. The pair of first sensing parts SP1 and the pair of second sensing parts SP2 are disposed in an order according to two horizontal rows Hi and Hi+1 and between adjacent vertical rows Vq, . . . , Vq+3, as shown in FIG. 2.

The first sensing part SP1 is driven by a gate signal at a high level applied to a (3 k−2)-th gate line $GL_{3k-2}$, and the first sensing part SP1 is reset by a gate signal at a high level applied to a (3 k−1)-th gate line $GL_{3k-1}$. The second sensing part SP2 is driven by the gate signal at the high level applied to the (3 k−1)-th gate line $GL_{3k-1}$, and the second sensing part SP2 is reset by a gate signal at a high level applied to a (3 k)-the gate line $GL_{3k}$. In an exemplary embodiment, "k" is a natural number.

Referring still to FIG. 2, the first sensing part SP1 may include a reference capacitor Cref, a sensing capacitor Clc, a switching element SW and a reset element RS.

The reference capacitor Cref may include a first electrode connected to the (3 k−2)-th gate line $GL_{3k-2}$ and a second electrode connected to the sensing capacitor Clc. The sensing capacitor Clc may include a touch electrode connected to the second electrode of the reference capacitor Cref and a common electrode applied with a common voltage Vcom. The switching element SW may include an input electrode (e.g., a source electrode) connected to the j-th voltage line VLj applied with a power signal, a control electrode (e.g., a gate electrode) connected to the reference capacitor Cref and the sensing capacitor Clc and an output electrode (e.g., a drain electrode) which outputs a sensing signal. The output electrode of the switching element SW is connected to a j-th sensing line SLj. The reset element RS may include a control electrode connected to the (3 k−1)-th gate line $GL_{3k-1}$, an input electrode connected to a j-th reset line RLj, to which a reset signal Vreset (FIG. 14) is applied, and an output electrode connected to the control electrode of the switching element SW. In an exemplary embodiment, "j" is a natural number.

The second sensing part SP2 may include a reference capacitor Cref, a sensing capacitor Clc, a switching element SW and a reset element RS2, similar to the first sensing part SP1.

The reference capacitor Cref of the second sensing part SP2 may include a first electrode connected to the (3 k−1)-th gate line $GL_{3k-1}$ and a second electrode connected to the sensing capacitor Clc. The sensing capacitor Clc may include a touch electrode connected to the second electrode of the reference capacitor Cref and a common electrode applied with the common voltage Vcom. The switching element SW may include an input electrode connected to a (j+2)-th voltage line VLj+2 applied with the power signal Vdd, a control electrode connected to the reference capacitor Cref and the sensing capacitor Clc, and an output electrode outputting a sensing signal. The output electrode of the switching element SW is connected to the (j+2)-th sensing line SLj+2. The reset element RS may include a control electrode connected to a (3 k)-th gate line GL3k, an input electrode connected to a (j+2)-th reset line RLj+2 to which the reset signal Vreset (FIG. 14) is applied, and an output electrode connected to the control electrode of the switching element SW. A width-to-length ("W/L") ratio, e.g., a ratio of a channel width to a channel length of the switching element SW, has a predetermined size. In an exemplary embodiment, for example, the W/L ratio of the switching element SW is from about 100:4.5 to about 400:4.5. For example, when a channel width of the switching element SW is about 275 μm and a channel length of the switching element SW is about 4.5 μm, a parasitic capacitance of the switching element is about 0.22 pF. As a size of the switching element SW increases, a capacity of the reference capacitor Cref and the sensing capacitor Clc increase. In an exemplary embodiment, when a capacitance of the reference capacitor Cref is equal to or greater than about 1 pF, a capacitance of the sensing capacitor Clc is equal to or greater than about 0.15 pF.

A driving process of the first sensing part SP1 and the second sensing part SP2 are substantially the same, and any repetitive detailed description will hereinafter be omitted. Thus, a driving process of the first sensing part SP1 will hereinafter be described in further detail.

When a gate signal at a high level is applied to the (3 k−2)-th gate line GL3k−1, a node voltage Vn develops at a connection node between the reference capacitor Cref and the sensing capacitor Clc. When a touch event is generated in the sensing capacitor Clc, e.g., by a physical pressure applied to the touchscreen display panel from an outside source (not shown), a value of the sensing capacitor Clc changes. Accordingly, the node voltage Vn changes. The switching element SW is turned on in response to the changed node voltage Vn, and a sensing signal corresponding to the changed node voltage Vn is outputted to the j-th sensing line SLj. When a gate signal at the high level is applied to the (3 k−1)-th gate line GL3k−1, the reset element RS is turned on to output the reset signal Vreset transmitted from the j-th reset line RLj to the switching element SW. Accordingly, the switching element SW is reset. In an exemplary embodiment, the reset signal Vreset is a signal substantially the same as to a gate signal at a low level.

Characteristics of the switching element SW determine a sensitivity of the sensing signals. In addition, the characteristics of the switching element SW are proportional to drain electric current as compared to a gate voltage thereof Moreover, a level of the drain electric current is proportional to the W/L ratio. Accordingly, a larger the size of the switching element SW is, resulting in a larger W/L ratio ensures that the sensing signals according to an exemplary embodiment have a high sensitivity.

Moreover, an increased changing range of the node voltage Vn results in an increased sensitivity of the sensing signals. In an exemplary embodiment, the node voltage Vn may be defined as Equation 1.

$$Vn = Vreset + ((Vg^+) - (Vg^-)) \times \frac{Cref}{(Cref + Clc + Cgd + Cgs)}$$

In Equation 1, Vg+ is a high voltage of a gate signal, Vg– is a low voltage of a gate signal, Cgd is a parasitic capacitance between a gate and a drain of a switching element SW and Cgs is a parasitic capacitance between a gate and a source of a switching element SW.

Referring to Equation 1, the node voltage Vn is inversely proportional to the parasitic capacitance of the switching element SW, Cgd+Clc, and the node voltage Vn increases, when the capacitance of the reference capacitor Cref increases. Thus, as an area of the sensing part is increased, the sensing capacitor Clc and the reference capacitor Cref in the sensing part increase, to increase a range of the node voltage Vn. When the range of the node voltage Vn is increased, the range of a sensing signal is increased, and the sensing signal is generated in response to the node voltage Vn. Accordingly, sensing characteristics of the sensing part SP according to an exemplary embodiment are substantially improved.

Thus, sensitivity is improved by manufacturing the switching element SW to have a large W/L ratio and by increasing a capacitance of the reference capacitor Cref and the sensing capacitor Clc.

Referring again to FIG. 2, the readout part RO may include an amplifier. In an exemplary embodiment, the amplifier may be an operational amplifier OP. A sensing signal provided from the sensing lines is input to the amplifier OP. The amplifier OP is connected to the sensing line SL to output a sensing signal for the first sensing part SP1 and the second sensing part SP2 having reset elements RS connected to different gate lines GL thereof, as described in greater detail above.

In an exemplary embodiment, for example, the amplifier OP outputs a readout signal Vo in response to a sensing signal transmitted through the (j+1)-th sensing line SLj+1 when a high level signal is applied to the (3 k–2)-th gate line $GL_{3k-2}$ during a horizontal period ("1 H"), and the amplifier OP outputs a readout signal Vo in response to a sensing signal transmitted through the (j+2)-th sensing line SLj+2 when a high level signal is applied to the (3 k–1)-th gate line $GL_{3k-1}$ during 2 H. Accordingly, the amplifier OP outputs the readout signal Vo in units of 1 H periods.

Figure 3:
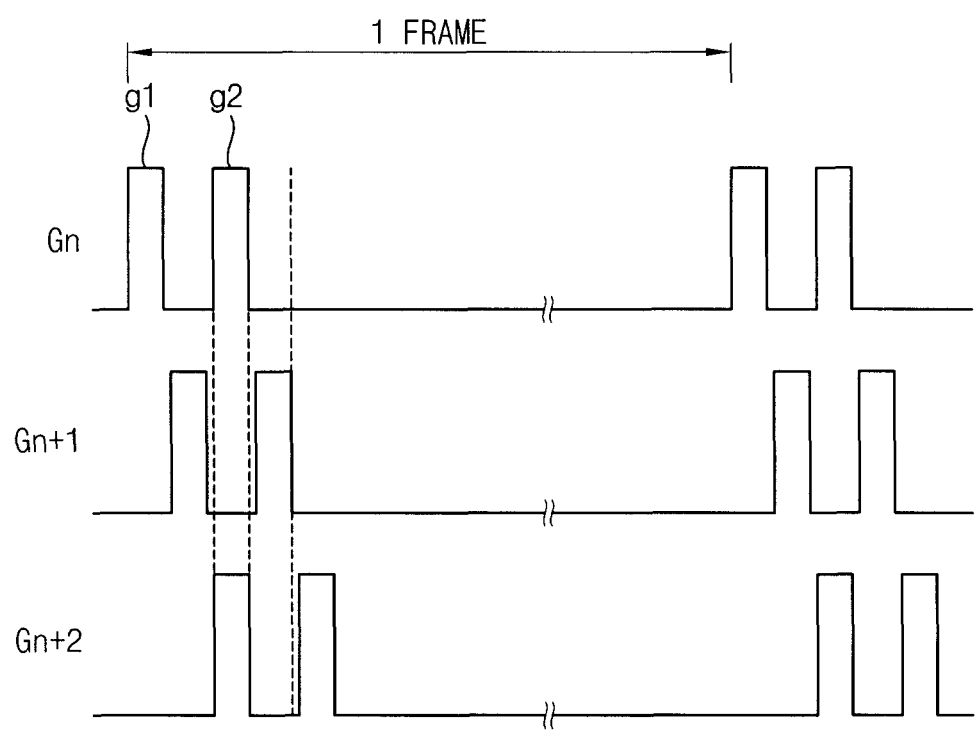
FIG. 3 is signal timing diagram illustrating an exemplary embodiment of gate signals provided to the touchscreen display device of FIG. 1.

FIG. 3 is a signal timing diagram of an exemplary embodiment of a gate signal applied to the touchscreen display device of FIG. 1.

Referring to FIGS. 2 and 3, each of gate signals Gn, Gn+1 and Gn+2 provided to the touchscreen display device according to an exemplary embodiment may include a first gate pulse g1 and a second gate pulse g2 within a single frame. In an exemplary embodiment, "n" is a natural number.

For example, the first gate signal Gn is applied to the (3 k–2)-th gate line $GL_{3k-3}$, the second gate signal Gn+1 is applied to the (3 k–1)-th gate line $GL_{3k-1}$, and the third gate signal Gn+2 is applied to the (3 k)-th gate line $GL_{3k}$.

A switching element SW of the first sensing part SP1 is driven by the first gate pulse g1 and the second gate pulse g2 of the first gate signal Gn, and a reset element RS of the first sensing part SP1 is reset by the first gate pulse g1 and the second gate pulse g2 of the second gate signal Gn+1. Likewise, switching element SW of the second sensing part SP2 is driven by the first gate pulse g1 and the second gate pulse g2 of the second gate signal Gn+1, and a reset element RS of the second sensing part SP2 is reset by the first gate pulse g1 and the second gate pulse g2 of the third gate signal Gn+2, as shown in FIG. 3.

As shown FIGS. 2 and 3, the second pulse g2 of the first gate signal Gn is applied to the (3 k–2)-th gate line $GL_{3k-2}$, and the first gate pulse g1 of the third gate signal Gn+2 is applied to the (3k)-th gate line $GL_{3k}$ at substantially the same time. Accordingly, a switching element SW of the first sensing part SP1 connected to the (3 k–2)-th gate line $GL_{3k-2}$ and a switching element SW of the second sensing part SP2 connected to the (3 k)-th gate line $GL_{3k}$ are driven substantially simultaneously. Thus, an amount of electric current of a sensing signal inputted to the amplifier OP at substantially the same time is doubled.

Figure 4:
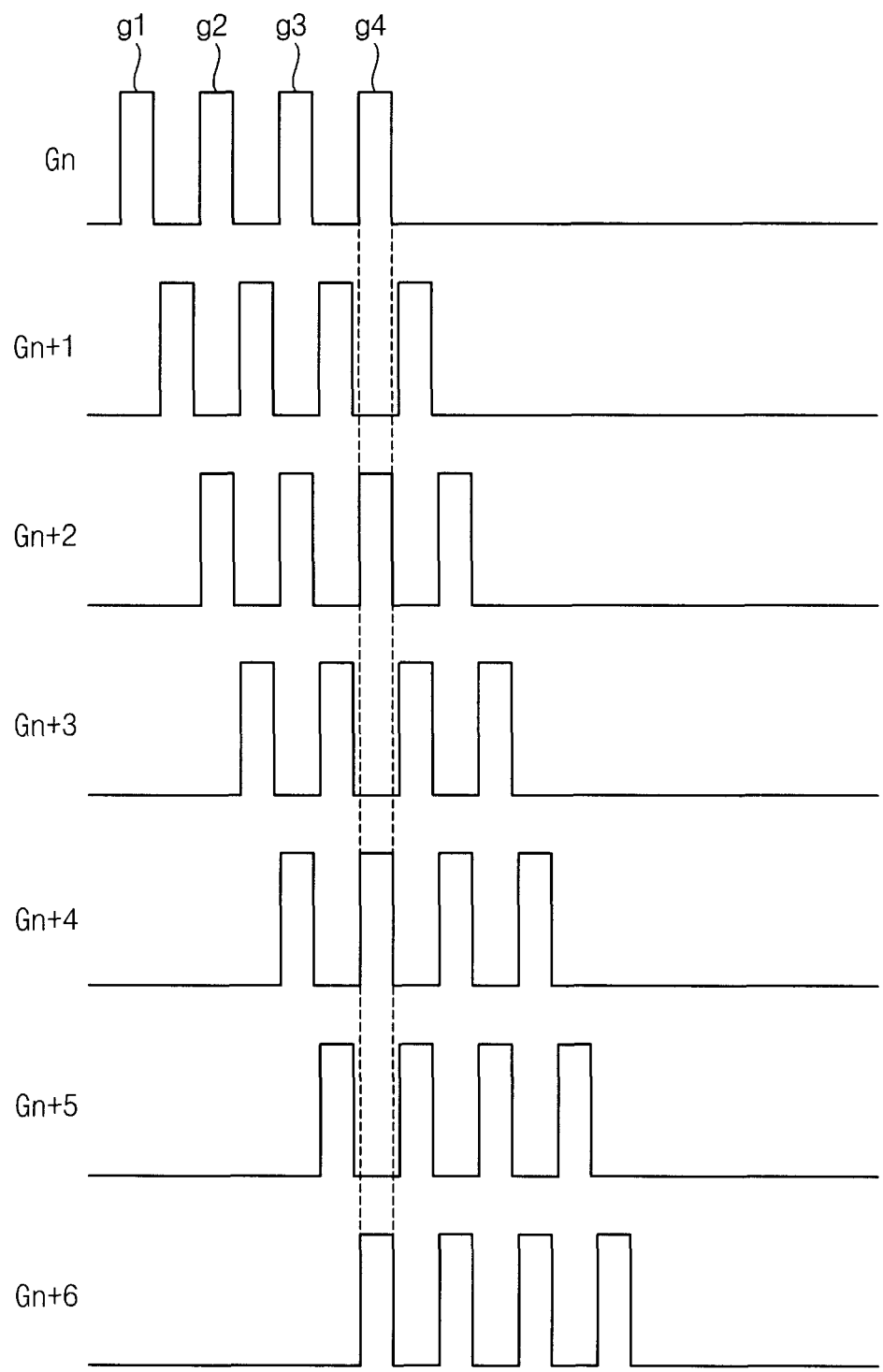
FIG. 4 is signal timing diagram illustrating an alternative exemplary embodiment of gate signals provided to the touchscreen display device of FIG. 1.

FIG. 4 is a signal timing diagram of an alternative exemplary embodiment of a gate signal applied to the touchscreen display device of FIG. 1.

Referring to FIGS. 2 and 4, each of gate signals Gn, Gn+1, Gn+2, . . . , Gn+6 provided to the touchscreen display device according to an exemplary embodiment may include four gate pulses, including a first, second, third, and fourth gate pulse g1, g2, g3 and g4, respectively, within one frame. In an exemplary embodiment, "n" is a natural number.

For example, the first gate signal Gn is applied to the first gate line, the second gate signal Gn+1 is applied to the second gate line, the third gate signal Gn+2 is applied to the third gate line, and the seventh gate signal Gn+6 is applied to the seventh gate line in substantially the same manner as described as above with reference to FIG. 3.

The first to the seventh gate lines are connected to the first and the second sensing parts SP1 and SP2, as partially shown in FIG. 2. For example, the first, third, fifth and seventh gate lines are connected to the switching elements SW of the first sensing part SP1 to control the switching elements SW of the first sensing part SP1. The second, fourth and sixth gate lines are connected to the reset elements RS of the first sensing part SP2 to control the reset elements RS of the first sensing part SP1. Additionally, the second, fourth and sixth gate lines are connected to the switching elements SW of the second sensing part SP2 to control the switching elements SW of the second sensing part SP2. The third, fifth and seventh gate lines are connected to the reset elements RS of the second sensing part SP2 to control the reset elements RS of the second sensing part SP2. In an exemplary embodiment, the first sensing part SP1 and the second sensing part SP2 may be alternately arranged with respect to respective gate lines, e.g., a first sensing part SP1 is connected to the first gate line, a second sensing part SP2 is connected to the second gate line, an additional component of the first sensing part SP1 is connected to the third gate line, an additional component of the second sensing part SP2 is connected to the fourth gate line, as shown in FIG. 2, but alternative exemplary embodiments are not limited thereto.

As shown FIG. 4, the fourth gate pulse g4 of the first gate signal Gn, the third gate pulse g3 of the third gate signal Gn+2, the second gate pulse g2 of the fifth gate signal Gn+4 and the first gate pulse g1 of the seventh gate signal Gn+6 are provided to the first, the third, the fifth and the seventh gate lines at substantially a same time.

Accordingly, the switching elements SW of the first sensing part SP1 connected to the first, third, fifth and seventh gate lines are driven at substantially the same time. Thus, the amount of electric current of a sensing signal inputted to the amplifier OP at substantially the same time is increased by a factor of four times.

As described in FIGS. 3 and 4, the gate signal may include an even number of gate pulses. However, as a number of the gate pulses increases, a sensing characteristic may deteriorate. Accordingly, an appropriate number and/or configuration of the gate pulses may be determined. For example, alternative exemplary embodiments include configurations wherein the gate signal may include an odd number of gate pulses.

Figure 5:
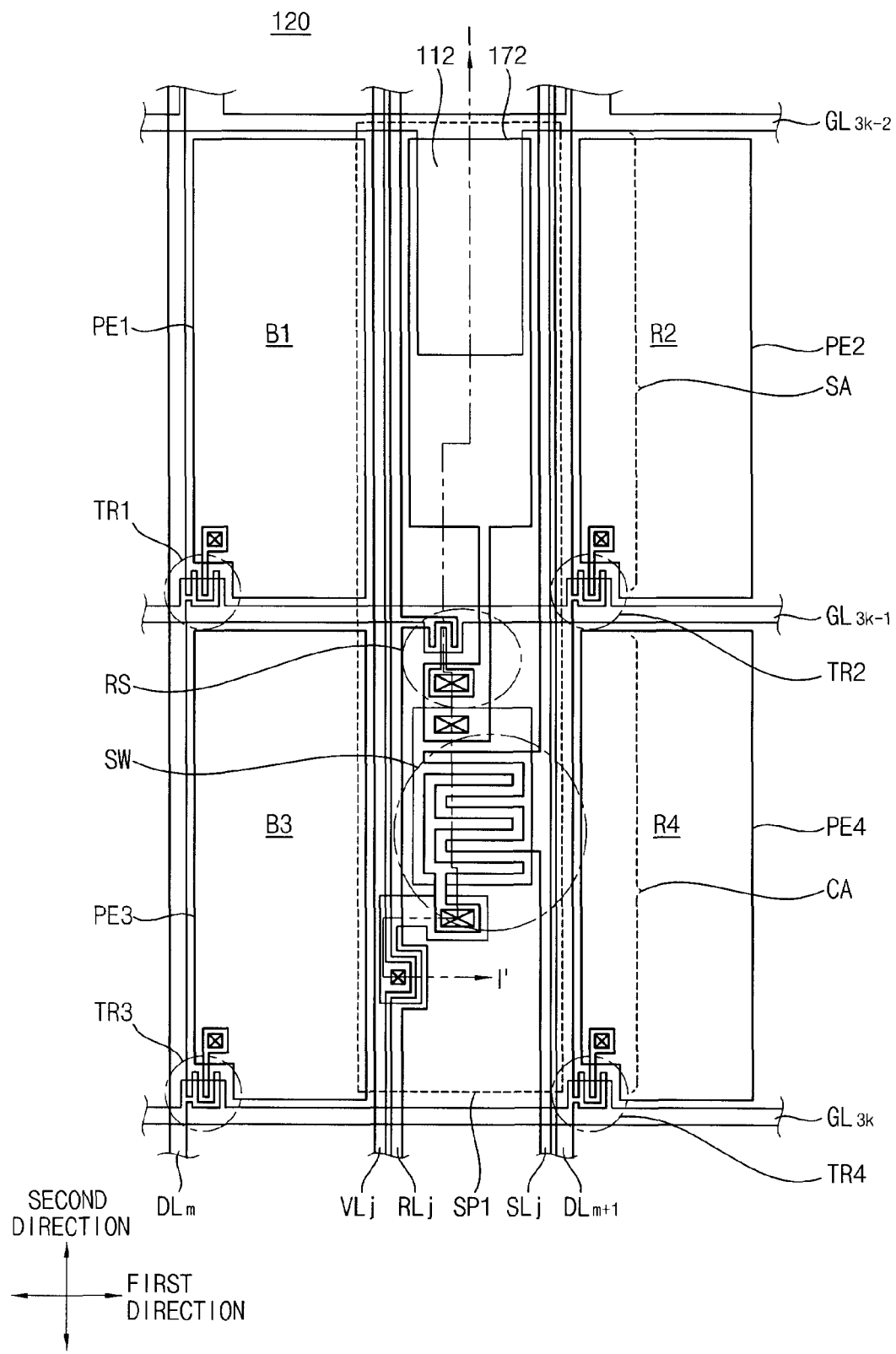
FIG. 5 is an enlarged plan view of portion A of FIG. 1.
Figure 6:
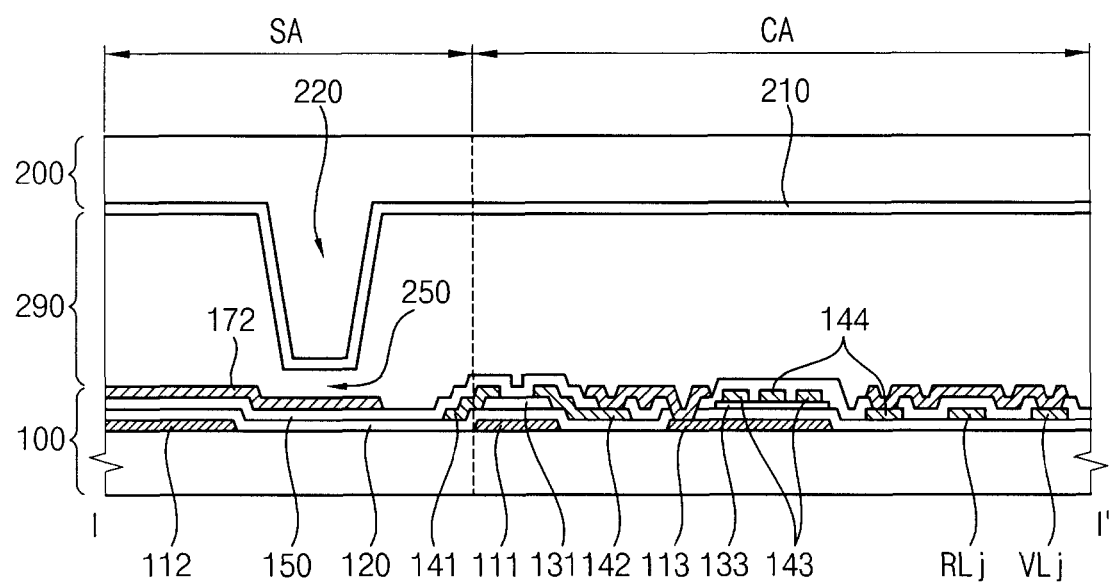
FIG. 6 is a partial cross-sectional view taken along line I-I' of FIG. 5.

FIG. 5 is an enlarged plan view of portion A of FIG. 1. FIG. 6 is a partial cross-sectional view taken along line I-I' of FIG. 5.

Referring to FIGS. 1, 5 and 6, the touchscreen display device according to an exemplary embodiment includes a touchscreen display substrate 100, an opposite substrate 200 and a liquid crystal layer 290.

The touchscreen display substrate 100 includes gate lines $GL_{3k-2}$, $GL_{3k-1}$ and $GL_{3k}$, data lines $DL_m$ and $DL_{m+1}$, voltage lines VLj, reset lines RLj and sensing lines SLj. The gate lines $GL_{3k-2}$, $GL_{3k-1}$ and $GL_{3k}$ extend along a first direction. The data lines $DL_m$ and $DL_{m+1}$, the voltage lines VLj, the reset lines RLj and the sensing lines SLj extend in a second direction substantially perpendicular to the first direction.

For example, a blue pixel B1 of a first pixel part P1 may include a first driving element TR1 connected to the (3 k−1)-th gate line $GL_{3k-1}$ and m data line $DL_m$ and a first pixel electrode PE1 electrically connected to the first driving element TR1. When the first driving element TR1 is turned on, a pixel voltage is applied to the first pixel electrode PE1. The blue pixel B1 may include the first pixel electrode PE1, a liquid crystal layer 290 and a liquid crystal capacitor defined by a common electrode 210 of the opposite substrate 200. The liquid crystal capacitor controls the arrangement of the liquid crystal layer by an electric field formed by the first pixel electrode PE1 and the common electrode 210 to display a blue color gray scale of an image.

A red pixel R2 of the second pixel part P2 may include a second driving element TR2 connected to the (3 k−1)-th gate line $GL_{3k-1}$ and an (m+1)-th data line $DL_{m+1}$, and a second pixel electrode PE2 electrically connected to the second driving element TR2. The red pixel R2 may include the second pixel electrode PE2, a liquid crystal layer 290 and a liquid crystal capacitor defined by the common electrode 210 of the opposite substrate 200.

A blue pixel B3 of the third pixel part P3 may include a third driving element TR3 connected to the (3 k)-th gate line $GL_{3k}$ and an m-th data line $DL_m$, and a third pixel electrode PE3 electrically connected to the third driving element TR3. The blue pixel B3 may include the third pixel electrode PE3, a liquid crystal layer 290 and a liquid crystal capacitor defined by the common electrode 210 of the opposite substrate 200.

A red pixel R4 of the fourth pixel part P4 may include a fourth driving element TR4 connected to the (3 k)-th gate line $GL_{3k}$ and the (m+1)-th data line $DL_{m+1}$, and a fourth pixel electrode PE4 electrically connected to the fourth driving element TR4. The red pixel R4 may include the fourth pixel electrode PE4, a liquid crystal layer 290 and a liquid crystal capacitor defined by the common electrode 210 of the opposite substrate 200.

The first sensing part SP1 is disposed between the blue pixel BI of the first pixel part P1 and the red pixel R2 of the second pixel part P2, and is disposed between the blue pixel B3 of the third pixel part P3 and the red pixel R4 of the fourth pixel part P4. The first sensing part SP1 is divided into sensing area SA and circuit area CA. More specifically, the sensing area SA is defined as a first area between the first and the second pixel parts P1 and P2, and the circuit area CA is defined as a second area between the third and the fourth pixel parts P3 and P4. The sensing area SA may be defined as having an area substantially the same as an area of the circuit area CA or, alternatively, larger than the area of the circuit area CA.

In an exemplary embodiment, the first sensing part SP1 includes a reference capacitor Cref, a sensing capacitor Clc, a reset element RS and a switching element SW. The reference capacitor Cref and the sensing capacitor Clc are disposed in the sensing area CA.

A first electrode 112 of the reference capacitor Cref protrudes, e.g., extends, from the (3 k−2)-th gate line $GL_{3k-2}$ into the sensing area SA. A transparent second electrode 172 is formed of a material substantially the same as a material of the first pixel electrode PE1, and overlaps the first electrode 112. The reference capacitor Cref includes the first electrode 112 and the transparent second electrode 172 which are overlapped with each other, and insulation layers 120 and 150 interposed between the first electrodes 112 and the transparent second electrode 172.

In an exemplary embodiment, the area of the first electrode 112 is about 200 μm by about 40 μm, and a thickness of the insulation layers 120 and 150 is about 0.47 μm, while the dielectric constant ϵ of the insulation layers 120 and 150 is about 6.6. A capacitance of the reference capacitor Cref is about 1 pF.

A touch electrode of the sensing capacitor Clc includes a portion of the transparent second electrode 172 which does not overlap the first electrode 112 of the reference capacitor Cref. The sensing capacitor Clc includes the touch electrode, the liquid crystal layer 290 and the common electrode 210 formed on the opposite substrate 200.

In an exemplary embodiment, an area of the touch electrode of the sensing capacitor Clc is about 155 μm by about 40 μm, and a gap of the liquid crystal layer 250 is about 0.9 μm, which is controlled by sensor spacer 220, while the dielectric constant ϵ of the liquid crystal layer 300 is about 7. A capacitance of the sensing capacitor Clc is about 0.43 pF.

The reset element RS and the switching element SW are disposed on the circuit area CA. The reset element RS may include a control electrode 111 connected to the (3 k−1)-th gate line $GL_{3k-1}$, an input electrode 141 connected to the j-th reset line RLj and an output electrode 142 spaced apart from the input electrode 141. In addition, the reset element RS may include a semiconductor layer 131 disposed on the control electrode 111.

The switching element SW may include a control electrode 113 electrically connected to an output electrode 142 of the reset element RS, an input electrode 143 connected to the j-th voltage line VLj and an output electrode 144 connected to the j-th sensing line SLj. The switching element SW may further include a semiconductor layer 133 disposed on the control electrode 113. As shown FIGS. 5 and 6, in an exemplary embodiment, the input electrode 143 and the output electrode 144 of the switching element SW have a substantially chevron, e.g., zigzag, shape to form a wide channel width. In one exemplary embodiment, a channel width of the switching element SW is about 275 μm, and a channel length of the switching element SW is about 4.5 μm.

As described above, because one sensing part SP corresponds to two pixel areas P adjacent to each other along the second direction (e.g., the column direction), a size of the switching element is be increased, and an electrode area of the sensing capacitor and the reference capacitor is therefore substantially increased. Thus, sensing characteristics of an exemplary embodiment are substantially improved.

Figure 7:
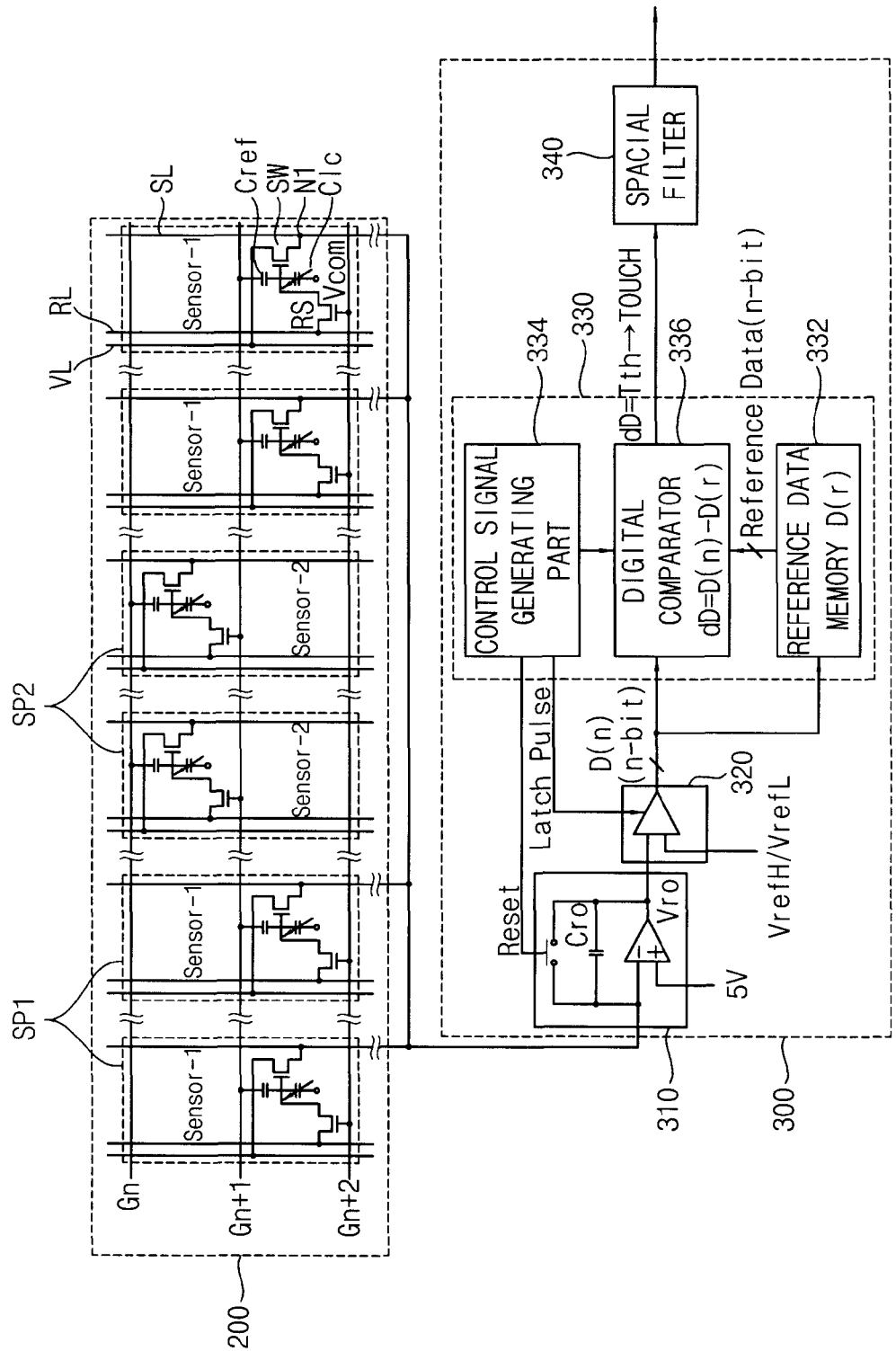
FIG. 7 is a block diagram of an exemplary embodiment of the touchscreen display device of FIG. 1.

FIG. 7 is a block diagram of an exemplary embodiment of a touchscreen display device.

Referring to FIG. 7, a touchscreen display apparatus according to an exemplary embodiment includes a touch panel 200 and a touch position detecting part 300 which calculates a touch coordinate of the touch panel 200 based on a readout current provided from the touch panel 200.

The touch panel 200 includes a sensing part SP. The sensing part SP may be disposed adjacent to a unit pixel area of an LCD panel (not shown). For example, when red, green and blue unit pixel areas are disposed on the LCD panel, the sensing part SP may be disposed adjacent to at least one of the red, green and blue unit pixel areas. Thus, when the LCD panel has a touch function, the LCD panel serves as the touch panel. The sensing part was described in further detail above with reference to FIG. 2, and any repetitive detailed description thereof will therefore be omitted.

The touch position detecting part 300 includes an integrator 310, an analog-to-digital ("A/D") converter 320 and a digital processing circuit 330.

The integrator 310 integrates a readout current detected at the sensing part and provides the A/D converter 320 with an integrated readout voltage Vro.

The A/D converter 320 converts the integrated readout voltage Vro integrated by the integrator 310 into a digital data and provides the digital processing circuit 330 with the converted digital data. In an exemplary embodiment, the digital data is a digital converted readout voltage data.

The digital processing circuit 330 includes a reference data memory 332, a control signal generating part 334 and a digital comparator 336, and compensates a variation of the digital converted readout voltage data to determine, e.g., to discriminate whether, a touching of the sensing part is generated.

The reference data memory 332 stores a reference data D(r).

The control signal generating part provides the integrator 310 with a reset signal, and provides the A/D converter 320 with a latch pulse.

The digital comparator 336 compares a difference between a current data D(n) provided from the A/D converter 320 and a reference data D(r) provided from the reference data memory 332 and a threshold data Tth to output a touch signal or, alternatively, a non-touch signal in response to a control signal provided from the control signal generating part 334 to discriminate whether a touching has occurred, e.g., a touch operation is generated.

The touch position detecting part 300 of the touchscreen apparatus according to an exemplary embodiment may further include a spatial filter 340 to substantially decrease noise.

In an exemplary embodiment, the sensor parts SP are divided into n×m sensor pixels (included in the touch panel 200) grouped into groups. Thus, the spatial filter 340 receives a touch signal (or, alternatively, a non-touch signal) provided from each of the digital comparators 336 for each of the groups, and determines whether each of the groups is in a touch state or a non-touch state.

More specifically, at least p numbers of the n×m sensor pixels are determined to be in a touch state, the spatial filter 340 may determine that the group is in a touch state. In an exemplary embodiment, for example, when n=2, m=4 and p=5, e.g., five pixels out of an 8 pixel group, are determined to be in a touch state, the whole 4×2 group of sensor pixels are determined as being in a touch state. However, when less than five pixels of the 4×2 sensor pixels are determined to be in a touch state, all of the 4×2 pixels are determined to be in a non-touch state.

In an operation of an exemplary embodiment, the readout voltage Vro is inputted to the A/D converter 320 as n-bit depth data, and is converted into n-bit digital data by the A/D converter 320 and inputted to the digital processing circuit 330. In an exemplary embodiment, initial data are stored in the reference data memory 332 as reference data D(r), and the current data (D(n)) are compared with the reference data at every frame. When a difference (dD=D(n)−D(r)) between the reference data D(r) and a current data D(n) is greater than threshold data (Tth), (e.g., dD>Tth), a touch status is determined.

The readout voltage Vro and a touch judging of one sensor line SL will now be described in further detail with reference to FIG. 8.

Figure 8:
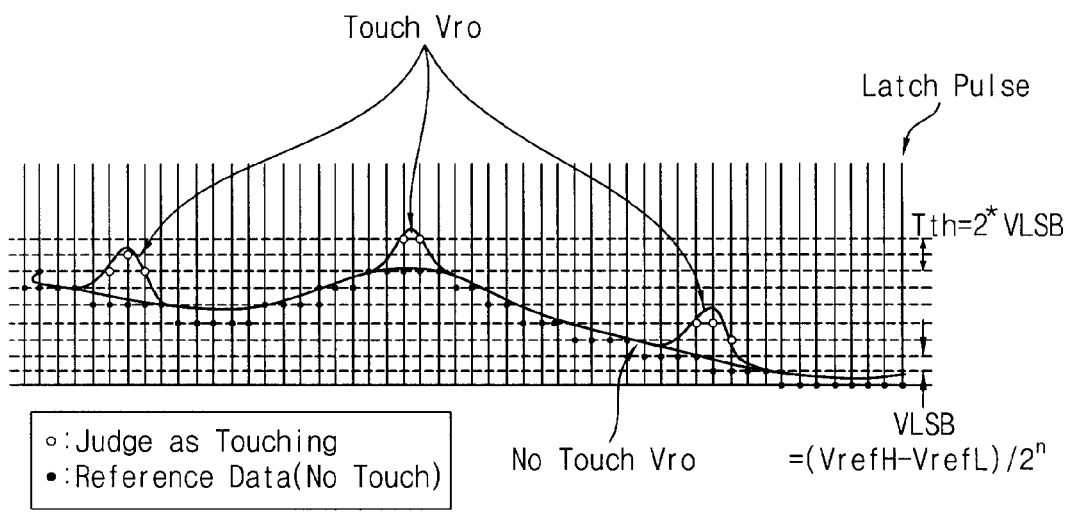
FIG. 8 is a signal timing diagram illustrating an exemplary embodiment of a touch discrimination based on a readout voltage detected at one sensor line of the touchscreen display device of FIG. 1.

FIG. 8 is a signal timing diagram illustrating an exemplary embodiment of a touch discrimination based on a readout voltage Vro detected at one sensor line of the touchscreen display device of FIG. 1.

Referring to FIG. 8, a non-touch readout voltage Vro, which is an analog type signal, is converted into a digital type signal and is stored in the reference data memory 332 as reference data (No Touch). In an exemplary embodiment, digital non-touch readout voltage is a digital type voltage difference of a least significant bit ("VLSB") step. When the A/D converted touch readout voltage Vro is greater than the reference data+threshold value (Tth), it is determined as a touch status.

As shown in FIG. 8, a threshold voltage Tth is 2*VLSB. Thus, touch events are still detected even though the non-touch readout voltage Vro has a large variation. In an exemplary embodiment, the threshold value Tth is a positive value. However, in an alternative exemplary embodiment, the threshold value Tth may have a negative value, depending on a sensor mode, for example. In addition, the threshold value Tth may be optimized based on a panel touch sensitivity, noise level or target application, for example. More particularly, the threshold value Tth may be set greater than a maximum noise voltage of sensors included in a touch panel, for example, but alternative exemplary embodiments are not limited thereto.

The number of bits of the threshold value Tth may be selected from 4 bits to 6 bits based on an application of a touchscreen apparatus or manufacturing cost of the touchscreen apparatus. For example, when a difference between a high reference voltage and a low reference voltage is 5 V, and a number of bits of the threshold value Tth is 5 bits, VLSB may be about 0.156 V.

When a touchscreen apparatus according to an exemplary embodiment is turned on, the reference data D(r) may be always rewritten to a current data D(n). Moreover, periodical resets of the reference data D(r) may be performed every 60 frames, for example.

In a touchscreen panel for an LCD apparatus, a response of a readout voltage Vro is slow. More specifically, response characteristics returning from a touch state to non-touch state may be slow. The slow response characteristics may be due to a cell gap of a liquid crystal layer and/or a slow recovery of a liquid crystal alignment therein. For example, a decay time may be about 2 seconds to about 5 seconds in a finger touch.

Figure 9:
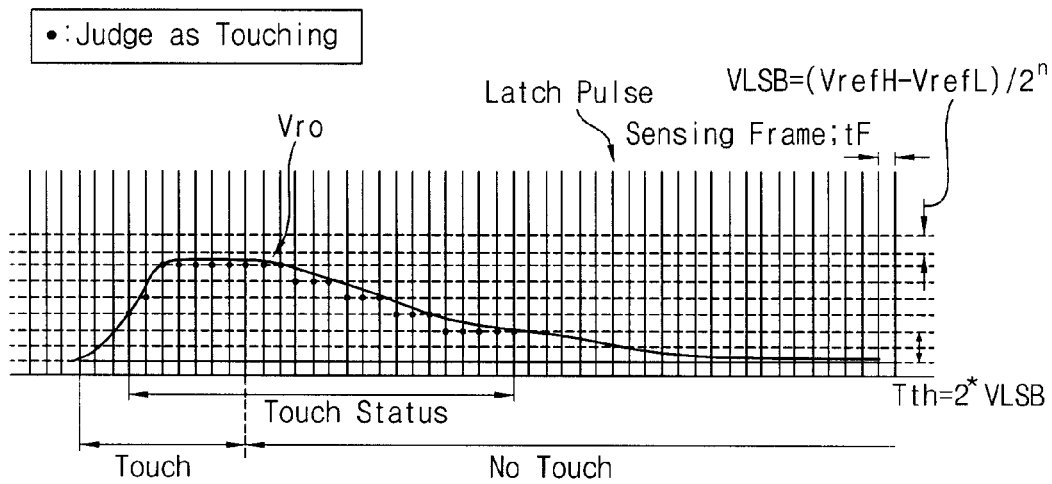
FIG. 9 is a signal timing diagram illustrating an exemplary embodiment of a touch discrimination of a sensor having an algorithm shown in FIG. 8.

FIG. 9 is a signal timing diagram illustrating an exemplary embodiment of a touch discrimination of a sensor having an algorithm shown in FIG. 8.

Referring to FIG. 9, when an algorithm as shown in FIG. 7 is applied to an apparatus having a touch screen, a touch state may include long decay time. As a result, a mis-sensing of touch may be determined even after a touch event is completed, and it may therefore be difficult to precisely sense a next touch event.

To solve the abovementioned problem, a touchscreen apparatus according to an exemplary embodiment includes a positive differential data sensing algorithm ("PDSA") employed therein. The PDSA will now be described in further detail with reference to FIGS. 10A and 10B.

Figure 10A:
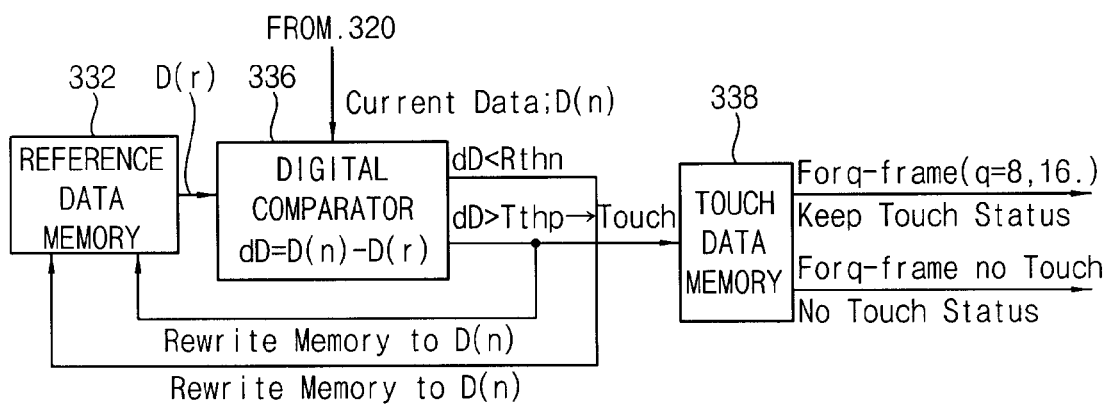
FIG. 10A is a block diagram of an exemplary embodiment of a digital calculating circuit utilizing a positive differential data sensing algorithm ("PDSA")
Figure 10B:
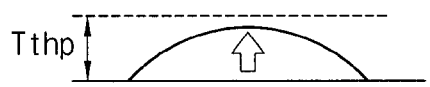
FIGS. 10B to 10D are signal timing diagrams illustrating an exemplary embodiment of a discrimination of a digital comparator of the digital calculating circuit shown in FIG. 10A.
Figure 10C:
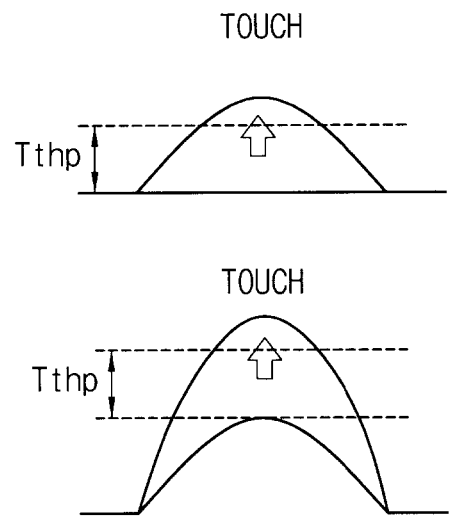
Figure 10D:
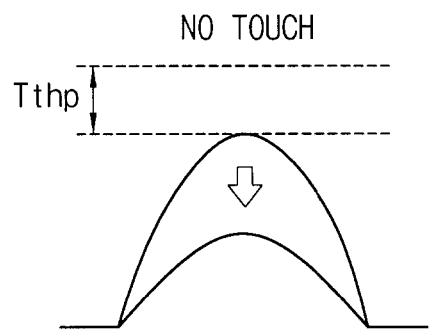

FIG. 10A is a block diagram of an exemplary embodiment of a digital calculating circuit having a positive differential data sensing algorithm. FIGS. 10B to 10D are signal timing diagrams illustrating an exemplary embodiment of a discrimination of a digital comparator of a digital calculating circuit shown in FIG. 10A.

Referring to FIGS. 10A to 10D, a basic circuit of a touchscreen apparatus is substantially the same as shown in FIG. 7 except for a digital processing circuit 330.

As described above, a touch state may be determined based on a positive differential data, although alternative exemplary embodiments are not limited thereto.

When a data difference dD between a current data D(r) provided from the A/D converter 320 and a reference data D(r) provided from the reference data memory 332 is greater than a positive threshold voltage Tthp (e.g., dD>Tthp), it is discriminated, e.g., determined, that a touch state has occurred, as shown in FIG. 10C. Touch state data indicating the touch state are stored in a touch data memory 338 and are maintained as a touch state during q-frames. In an exemplary embodiment, "q" is a natural number such as 8, 16 or 24, for example, but alternative exemplary embodiments are not limited thereto.

In contrast, when a data difference dD between a current data D(r) provided from the A/D converter 320 and a reference data D(r) provided from the reference data memory 332 is less than or equal to the positive threshold voltage Tthp (e.g., dD≤Tthp), it is determined as a non-touch state, as shown in FIG. 10B. Touch state data determined to be the non-touch state are stored in the touch data memory 338.

Moreover, when the data difference dD is greater than the positive threshold voltage Tthp (e.g., dD>Tthp) or the data difference dD is less than a negative reset threshold data Rthn (e.g., dD<Rthn), the reference data D(r) is rewritten as a current data D(n).

Thus a readout voltage having a positive variation is detected, it is determined as a touch state (as shown in FIG. 10C). When a readout voltage having a small positive variation is detected, as shown in FIG. 10B, or a readout voltage Vro having a negative variation is detected, as shown in FIG. 10D, it is determined to be a non-touch.

Touch data are stored in the touch data memory 338, and a touch state is maintained during q-frames. Here, q is 8-frame or 16-frame. Thus, while a touch data is inputted, a touch state is continued. When non-touch data are inputted during the q-frames, the touch state is changed into a non-touch state, as will now be described in further detail with reference to FIG. 11.

Figure 11:
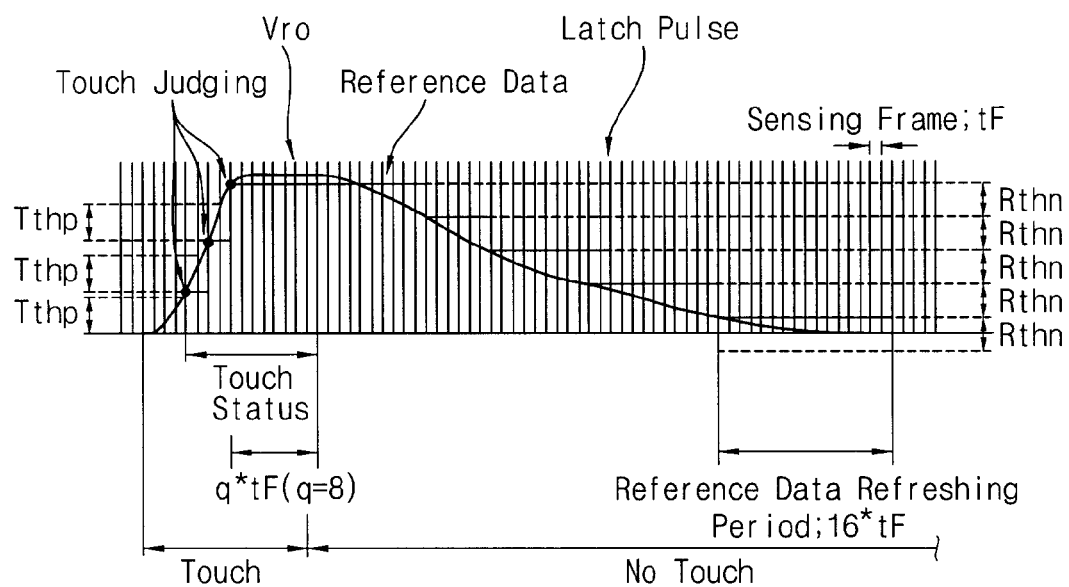
FIG. 11 is a signal timing diagram illustrating an exemplary embodiment of a touch discrimination of a sensor having a PDSA.

FIG. 11 is a signal timing diagram illustrating an exemplary embodiment of a touch discrimination of a sensor having a PDSA.

Referring to FIG. 11, a reference data D(r) (FIG. 10A) is rewritten in accordance with a variation of the following readout voltage Vro. In an exemplary embodiment, touch discrimination may be performed by a difference of a readout voltage Vro, not by an absolute value of the readout voltage Vro.

Thus, the touch discrimination may be performed by a positive difference data. Accordingly, during a touch event, the touch determination is made when the readout voltage Vro is increased.

When touch determination is generated within a refreshing period of a reference data, such as 16×tF, where tF is a period of the latch pulse, it is determined as a continuous touching.

When a re-writing is not carried out during a period which is less than a refreshing period of a reference data, such as 16×tF, the reference data D(r) is re-written. The re-writing of the reference data D(r) is important in sensing a re-touching, such as a fast double click during decay of a determined touch period.

In an exemplary embodiment, a touch threshold voltage Tthp having a positive value, a reset threshold data Rthn having a predetermined value and a q value may be optimized based on a sensing of a touch panel, a response speed of a read-out voltage, a noise level or a touchscreen included therein, for example.

When the reference data D(r) is re-written in the presence of a negative voltage noise, it may be misdetermined as a touch state without a touch event. Thus, when a continuous touch discrimination of m times (where "m" is a natural number greater than 2) is discriminated as a touch event, a mis-operation due to the negative voltage noise is substantially reduced and/or effectively prevented.

Hereinafter, an exemplary embodiment of a method which determines an end point of a touch status will be described in further detail.

Figure 12:
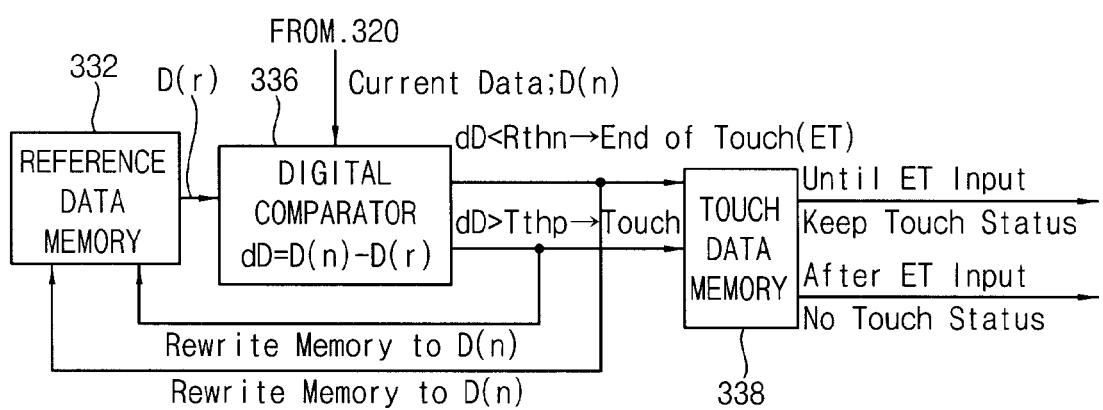
FIG. 12 is a block diagram of an exemplary embodiment of a touch discrimination operation of an exemplary embodiment of a touchscreen device having a PDSA.
Figure 13:
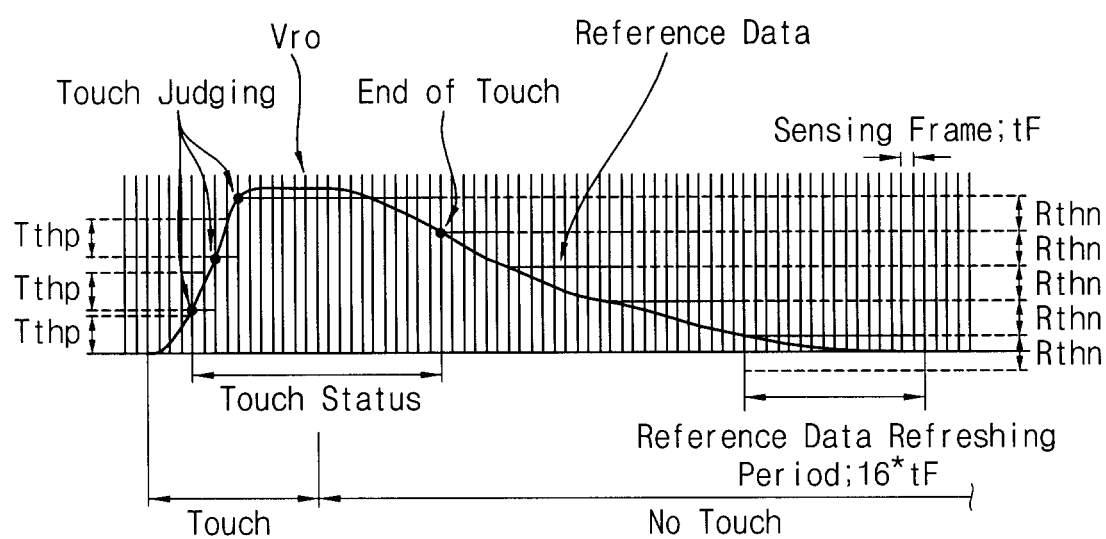
FIG. 13 is a signal timing diagram illustrating an exemplary embodiment of a PDSA.

FIG. 12 is a block diagram of an exemplary embodiment of a touch discrimination of a touchscreen device having a PDSA. FIG. 13 is a signal timing diagram illustrating an exemplary embodiment of a PDSA.

Referring to FIGS. 12 and 13, an end of a touch state may be determined by using a first timing when a difference between a current data D(n) and a reference data D(r) is less than a negative reset threshold voltage Rthn (e.g., when dD<Rthn) after a touch event. In an exemplary embodiment, the touch end signal is inputted to the touch data memory 338 at a timing at which the difference is less than the negative reset threshold voltage (e.g., dD<Rthn). The touch data is stored in the touch data memory 338, and the touch state is maintained until a touch end signal is inputted. Thus, a state may be determined to be a continuous touch.

As described in greater detail above, a touch even is detected using a positive differential data. Alternatively, the touch detecting may be determined from a negative differential data, or alternatively, positive differential data and negative differential data based on a design of touch panel characteristics of a sensor and a touchscreen manufacturing process, for example.

When a touch panel is operated for an extended period of time, a readout voltage varies due to a variation of characteristics of transistors and/or capacitors included in a touchscreen panel, or a threshold voltage shift of a transistor due to DC bias stress, for example.

More particularly, in operation of a touch panel, when temperature is varied from about 25 degrees Celsius to about 60 degrees Celsius over a period of about 10 hours, a total variation of the readout voltage is about 3 V. To effectively prevent the variation of the readout voltage, the reset voltage Vreset, is applied to source electrodes of all reset transistors RS via the reset voltage line RL, according to an exemplary embodiment is adjusted.

Hereinafter, an exemplary embodiment of a touchscreen apparatus having an auto adjustment function of a reset voltage Vreset will be described in further detail with reference to FIGS. 14 and 15.

Figure 14:
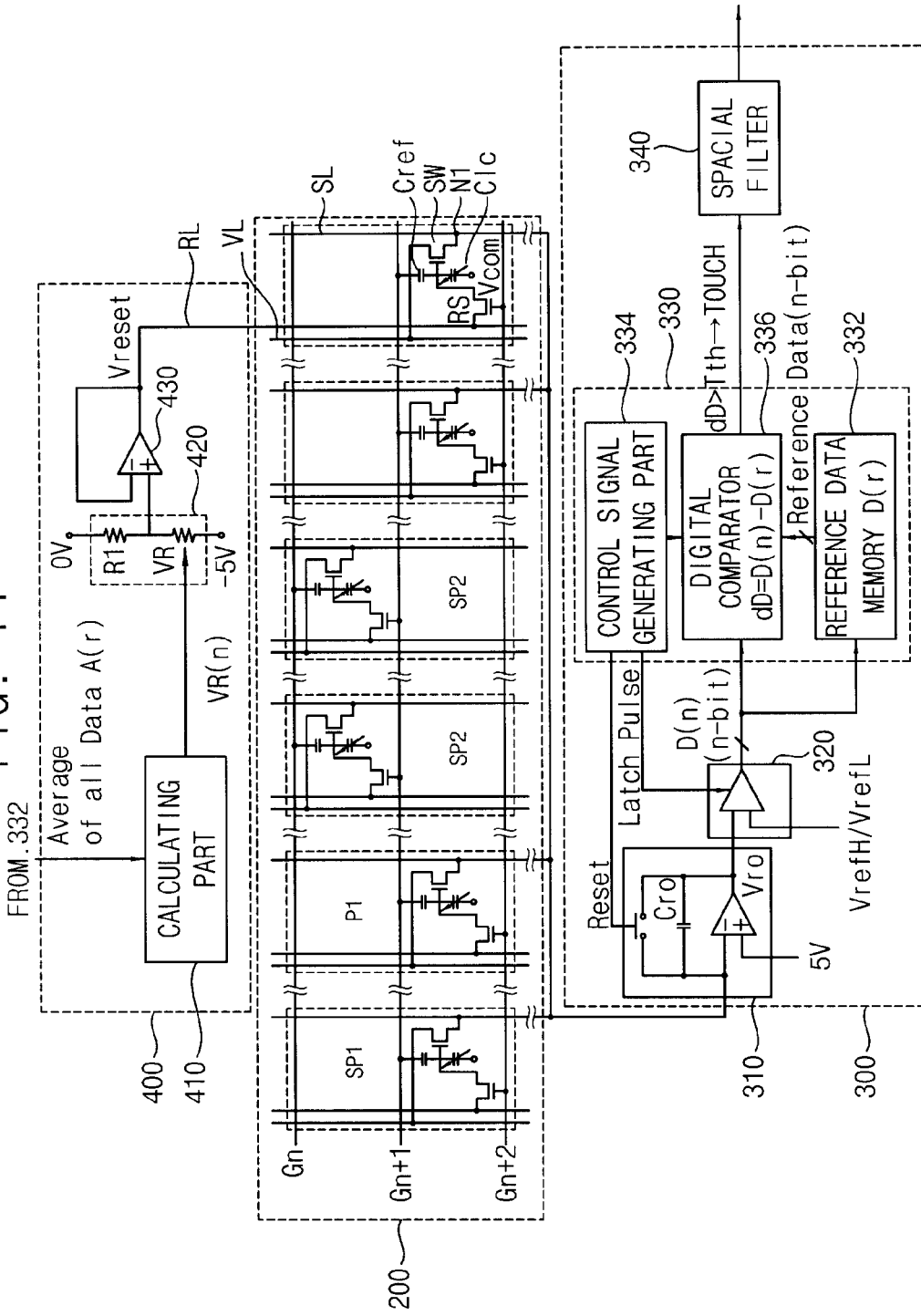
FIG. 14 is a block diagram of an alternative exemplary embodiment of a touchscreen display device.

FIG. 14 is a block diagram of an alternative exemplary embodiment of a touchscreen display device.

Referring to FIG. 14, a touchscreen apparatus according to an exemplary embodiment includes a touch panel 200, a touch position detecting part 300 and a reset voltage adjusting part 400. The same reference characters will be used to refer to the same or like parts in FIG. 14 as those described in greater detail above with reference to FIG. 7, and any repetitive detailed explanation thereof will be omitted.

The reset voltage adjusting part 400 includes a calculating part 410, a voltage dividing part 420 and a buffer amplifier 430.

The calculating part 410 calculates a current reset adjustment voltage VR(n) based on an average value A(r) of all reference data D(r) stored in the reference data memory 332. The all average value A(r) of the readout voltage Vro may be obtained from the reference data memory 332.

The calculating part 410 obtains a current reset adjustment voltage VR(n) in accordance with the Equation 2 to provide the voltage dividing part 420 with the obtained current reset adjustment voltage Vr(n).

$$VR(n)=VR(n-1)+(A(r)-D(T))\times a, \quad \text{Equation 2}$$

In Equation 2, VR(n) is a current reset adjustment voltage, VR(n−1) is a previous reset adjustment voltage, A(r) represents an average value of a whole reference data, D(T) is target reference data, and "a" represents a compensation coefficient.

The voltage dividing part 420 includes a first resistor R1 and a variable resistor VR to divide a voltage in response to the current reset adjustment voltage VR(n) provided from the calculating part 410.

A first terminal of the first resistor R1 is connected to a ground voltage, and a second terminal of the first resistor R1 is connected to the buffer amplifier 430.

The variable resister VR includes a first terminal connected to a negative voltage and a second terminal connected to the buffer amplifier 430 to provide the buffer amplifier 430 with a varied negative voltage in accordance with the current reset adjustment voltage VR(n).

The voltage dividing part includes a first resistor R1 and a variable resistor VR. A first terminal of the first resistor R1 is connected to a ground voltage, and a second terminal of the first resistor R1 is connected to the buffer amplifier 430. A first terminal of the variable resistor VR is connected to a negative voltage (e.g., −5V, but alternative exemplary embodiments are not limited thereto), and a second terminal of the variable resistor VR is connected to the buffer amplifier 430. The variable resistor VR provides the buffer amplifier 430 with a negative voltage is varied in accordance with the current readout voltage Vro.

An output of the buffer amplifier 430 provides the reset voltage Vreset to a source of the reset transistor RS included in the sensing part 140 via a reset voltage line RL.

When the reset voltage Vset is increased, readout current is increased and the latched readout voltage Vro is decreased.

Thus, when an average value A(r) of a whole reference data D(r) is greater than a target reference data D(T), a current reset adjusting voltage VR(n) is increased.

When the average value A(r) of a whole reference data D(r) is the same as the target reference data D(T) (that is, A(r)=D(T)), a current reset adjusting voltage VR(n) is not varied (that is, VR(n)=VR(n−1)).

When the compensation coefficient "a" is large, the readout voltage Vro is overshoot or, alternatively, is undershoot, e.g., is vibrated.

When the compensation coefficient "a" is small, however, the compensation is not performed and the readout voltage Vro is not varied, e.g., is damped.

Figure 15:
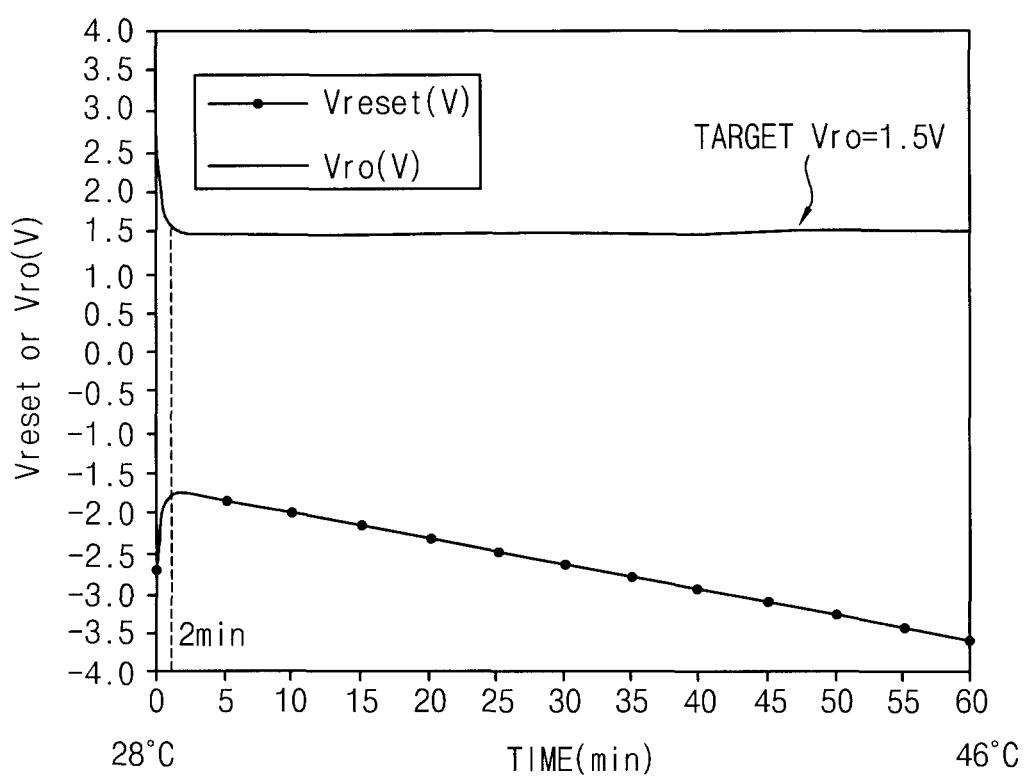
FIG. 15 is a graph of voltage versus time illustrating a simulation result of an exemplary embodiment of an auto adjusting of a reset voltage.

FIG. 15 is a graph of voltage versus time illustrating a simulation result of an exemplary embodiment of an auto adjusting of a reset voltage. As shown in an example of a simulation result in FIG. 15, in an operation of a touchscreen display apparatus according to an exemplary embodiment, when a driving temperature is varied from about 28 degrees Celsius to about 46 degrees Celsius during a period of about 60 minutes, and an initial variable resistor VR is about 12 KOhm, a first resistor R1 is about 30 KOhm, a compensation coefficient a is 5, a target readout voltage is about 1.5 V.

Referring to FIG. 15, an original readout voltage Vro is about 3.6 V and a reset voltage Vreset is about −3.6 V However, a readout voltage is adjusted to 1.5V after about two minutes, and the adjusted reset voltage Vreset is about −1.75 V in an exemplary embodiment.

Thus, when an operating temperature of the touchscreen display apparatus according to an exemplary embodiment is increased to about 46 degrees Celsius, the reset voltage Vreset is adjusted from −1.75 V to about −3.6 V, and the readout voltage Vro is effectively maintained at about 1.5 V at a target voltage.

According to exemplary embodiments described herein, a variation of a readout voltage generated by a threshold voltage of transistors disposed in a touch panel or a sensor capacitance variation is compensated for, and mis-touch discrimination is thereby substantially reduced and/or effectively prevented. Therefore, a touch position detecting capability of the touch screen display panel according to an exemplary embodiment is substantially enhanced.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method for detecting a touch position, the method comprising:

integrating a readout current detected at a sensing part to generate an integrated readout voltage;

converting the integrated readout voltage into a digital converted readout voltage data;

compensating a variation of the digital converted readout voltage data to determine whether the sensing part is touched based on a difference between a current data corresponding to the digital converted readout voltage data and a reference data with a threshold data, wherein the current data is rewritten as the reference data when the difference between the current data and the reference data is substantially greater than a positive touch threshold data; and adjusting a reset voltage provided to a reset transistor of the sensing part to generate an adjusted reset voltage, wherein the adjusting the reset voltage comprises:

calculating a current reset adjustment voltage bases on an average value of a reference data;

dividing a voltage in response to the current reset adjustment voltage to generate a divided voltage; and providing the reset transistor with the reset voltage in response to the divided voltage, wherein the calculating the current reset adjustment voltage is performed based on:

$$VR(n)=VR(n-1)+(A(r)-D(T))\times a,$$

wherein VR(n) is the current reset adjustment voltage, VR(n−1) is a previous reset adjustment voltage, A(r) is an average value of a whole reference data, D(T) is target reference data, and a is a compensation coefficient.

2. An apparatus for detecting a touch position, the apparatus comprising:
   an integrator which integrates a readout current detected at a sensing part to generate an integrated readout voltage;
   an analog-to-digital converter which converts the integrated readout voltage into a digital converted readout voltage data; and
   a digital processing circuit which compensates a variation of the digital converted readout voltage data to determine whether the sensing part is touched, based on a difference between a current data corresponding to the digital converted readout voltage data and a reference data with a threshold data, wherein the current data is rewritten as the reference data when the difference between the current data and the reference data is greater than a positive reset threshold data,
   wherein the sensing part comprises:
   a reference capacitor connected to a previous gate line through a first terminal thereof;
   a sensing capacitor having a capacitance which varies based on a touch operation;
   a writing transistor comprising:
      a gate connected to a first terminal of the sensing capacitor and a second terminal of the reference capacitor;
      a source connected to a bias voltage line which transmits a bias voltage; and
      a drain connected to a sensing voltage line which transmits a sensing voltage; and
   a reset transistor comprising:
      a gate connected to a current gate line;
      a source connected to a reset voltage line which transmits a reset voltage; and
      a drain connected to a first terminal of the sensing capacitor, a second terminal of the reference capacitor and a gate of the writing transistor.

3. The apparatus of claim 2, wherein the digital processing circuit comprises:
   a reference data memory which stores the reference data;
   a control signal generating part which provides the integrator with a reset signal and the analog-to-digital converter with a latch pulse; and
   a digital comparator which compares a difference between a current data provided from the analog-to-digital converter and a reference data provided from the reference data memory with the threshold data in response to a control signal provided from the control signal generating part to discriminate whether a touch operation is performed.

4. The apparatus of claim 3, wherein a bit-depth of digital converted readout voltage data outputted from the analog-to-digital converter and the reference data is in a range from four bits to six bits.

5. The apparatus of claim 3, wherein the digital comparator rewrites the current data as the reference data in the reference data memory when the difference between the current data and the reference data is less than a negative reset threshold data.

6. The apparatus of claim 3, wherein the digital comparator outputs a touch discrimination data when the difference between the current data and the reference data is greater than the positive reset threshold data.

7. The apparatus of claim 6, further comprising a touch data memory which stores the touch discrimination data provided from the digital comparator and maintains one of a touch state and a non-touch state based on the touch discrimination data provided from the digital comparator during a predetermined frame.

8. The apparatus of claim 3, wherein the reference data is rewritten based on a start operation.

9. The apparatus of claim 3, wherein the digital processing circuit determines the touch state is performed when the difference between the current data and the reference data is greater than the positive reset threshold data.

10. The apparatus of claim 3, wherein
   the sensing part further comprises groups of sensing pixels corresponding to digital comparators of a plurality of the digital comparators, and
   the digital processing circuit further comprises a spatial filter which receives one of a touch signal and a non-touch signal provided from each of the digital comparators to discriminate whether a corresponding group of sensing pixels is in one of a touch state and a non-touch state, respectively.

11. The apparatus of claim 2, further comprising a reset voltage adjusting part which adjusts a reset voltage provided to the reset transistor.

12. The apparatus of claim 11, wherein the reset voltage adjusting part comprises:
   a calculating part which calculates a current reset adjustment voltage based on an average value of a whole reference data stored in the reference data memory;
   a voltage dividing part which divides a voltage in response to the current reset adjustment voltage provided from the calculating part; and
   a buffer amplifier which provides the reset transistor with an adjusted reset voltage adjusted in response to a divided voltage provided from the voltage dividing part.

13. The apparatus of claim 12, wherein the calculating part provides the voltage dividing part with the current reset adjustment voltage based on:

$$VR(n)=VR(n-1)+(A(r)-D(T))\times a,$$

wherein $VR(n)$ is the current reset adjustment voltage, $VR(n-1)$ is a previous reset adjustment voltage, $A(r)$ is an average value of a whole reference data, $D(T)$ is target reference data, and "a" is a compensation coefficient.

14. A touchscreen display apparatus comprising:
   a liquid crystal display panel comprising:
      a touchscreen display substrate including a pixel array and a sensing array;
      an opposite substrate disposed opposite to the touchscreen display substrate; and
      a liquid crystal layer interposed between the touchscreen display substrate and the opposite substrate; and
   a touch position detection apparatus comprising:
      an integrator which integrates a readout current detected at a sensing part to generate an integrated readout voltage;
      an analog-digital converter which converts the integrated readout voltage into a digital converted readout voltage data; and
      a digital processing circuit which compensates a variation of the digital converted readout voltage data to determine whether the sensing part is touched, based on a difference between a current data corresponding to the digital converted readout voltage data and a reference data with a threshold data, wherein the current data is rewritten as the reference data when the difference between the current data and the reference data is greater than a positive reset threshold data,
      wherein the sensing part comprises:
         a reference capacitor connected to a previous gate line through a first terminal thereof;

a sensing capacitor having a capacitance which varies based on a touch operation;
a writing transistor comprising:
    a gate connected to a first terminal of the sensing capacitor and a second terminal of the reference capacitor;
    a source connected to a bias voltage line which transmits a bias voltage; and
    a drain connected to a sensing voltage line which transmits a sensing voltage; and
a reset transistor comprising:
    a gate connected to a current gate line;
    a source connected to a reset voltage line which transmits a reset voltage; and
    a drain connected to a first terminal of the sensing capacitor, a second terminal of the reference capacitor and a gate of the writing transistor.

* * * * *